United States Patent
Davies

(10) Patent No.: US 10,200,692 B2
(45) Date of Patent: Feb. 5, 2019

(54) COMPRESSED DOMAIN DATA CHANNEL FOR WATERMARKING, SCRAMBLING AND STEGANOGRAPHY

(71) Applicant: Cisco Technology, Inc., San Jose, CA (US)

(72) Inventor: Thomas Davies, Guildford (GB)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 15/460,638

(22) Filed: Mar. 16, 2017

(65) Prior Publication Data
US 2018/0270484 A1   Sep. 20, 2018

(51) Int. Cl.
| | |
|---|---|
| H04N 19/13 | (2014.01) |
| H04N 19/61 | (2014.01) |
| H04N 19/70 | (2014.01) |
| H04N 19/88 | (2014.01) |
| H04N 19/117 | (2014.01) |

(Continued)

(52) U.S. Cl.
CPC ........... *H04N 19/13* (2014.11); *H04N 19/117* (2014.11); *H04N 19/124* (2014.11); *H04N 19/159* (2014.11); *H04N 19/467* (2014.11); *H04N 19/513* (2014.11); *H04N 19/61* (2014.11); *H04N 19/70* (2014.11); *H04N 19/88* (2014.11); *H04N 19/172* (2014.11); *H04N 19/184* (2014.11)

(58) Field of Classification Search
CPC .... H04N 19/117; H04N 19/124; H04N 19/13; H04N 19/159; H04N 19/172; H04N 19/184; H04N 19/467; H04N 19/513; H04N 19/61; H04N 19/70; H04N 19/88
See application file for complete search history.

(56) References Cited

U.S. PATENT DOCUMENTS

| | | | |
|---|---|---|---|
| 6,226,618 B1 * | 5/2001 | Downs | ............... G06F 21/10 380/279 |
| 7,240,196 B2 | 7/2007 | Cooper et al. | |

(Continued)

OTHER PUBLICATIONS

Y. Tew, et al., "An Overview of Information Hiding in H.264/AVC Compressed Video", IEEE Transactions on Circuits and Systems for Video Technology, vol. 24, No. 2, Feb. 2014, 15 pages.

(Continued)

*Primary Examiner* — Anner N Holder
(74) *Attorney, Agent, or Firm* — Edell, Shapiro & Finnan, LLC

(57) ABSTRACT

A computer-implemented method is provided for processing a video stream in the compressed domain for watermarking, scrambling and other applications. Syntax elements are generated for input video as part of a video compression process. The syntax elements are entropy coded with an arithmetic entropy encoding process to produce a compressed bitstream for the input video. Regions of frames and related syntax elements of the input video are identified as candidates for modification. Based on metadata associated with a particular user, the syntax elements, the regions, and entropy coding state of the arithmetic entropy encoding process, bytes of the input video are changed to generate a modifying bitstream that is unique to the particular user; and modifying the compressed bitstream using the modifying bitstream to produce a decodable bitstream for the input video.

20 Claims, 10 Drawing Sheets

(51) Int. Cl.
  *H04N 19/124* (2014.01)
  *H04N 19/159* (2014.01)
  *H04N 19/172* (2014.01)
  *H04N 19/184* (2014.01)
  *H04N 19/467* (2014.01)
  *H04N 19/513* (2014.01)

(56) References Cited

U.S. PATENT DOCUMENTS

| | | | |
|---|---|---|---|
| 7,426,750 B2 | 9/2008 | Cooper et al. | |
| 7,430,302 B2 | 9/2008 | Thorwirth | |
| 7,738,677 B2 | 6/2010 | Thorwirth | |
| 7,853,040 B2 | 12/2010 | Thorwirth | |
| 8,515,123 B2 | 8/2013 | Thorwirth | |
| 8,538,886 B1* | 9/2013 | Iu | G06T 1/005 380/252 |
| 8,731,193 B2 | 5/2014 | Farkash et al. | |
| 8,995,711 B2 | 3/2015 | Thorwirth | |
| 9,208,534 B2 | 12/2015 | Cain et al. | |
| 9,253,165 B2 | 2/2016 | Peterka et al. | |
| 9,268,949 B2 | 2/2016 | Kulakowski et al. | |
| 9,271,016 B2 | 2/2016 | Solonsky et al. | |
| 2002/0002468 A1* | 1/2002 | Spagna | G06F 21/10 713/193 |
| 2003/0110130 A1* | 6/2003 | Pelletier | G06Q 30/02 705/50 |
| 2004/0120404 A1* | 6/2004 | Sugahara | G10L 19/24 375/240.23 |
| 2006/0095792 A1* | 5/2006 | Hurtado | G06F 21/10 713/189 |
| 2009/0067626 A1* | 3/2009 | Dufaux | H04N 21/23476 380/217 |
| 2014/0047475 A1* | 2/2014 | Oh | H04N 21/4355 725/40 |

OTHER PUBLICATIONS

Y. Tew, et al., "Information Hiding in HEVC Standard Using Adaptive Coding Block Size Decision", 2014 IEEE International Conference on Image Processing (ICIP), Oct. 27-30, 2014, ISBN: 978-1-4799-5751-4, 5 pages.
M. Barni, et al., "A DCT-domain System for Robust Image Watermarking", Signal Processing, vol. 66, Issue 3, May 28, 1998, pp. 357-372, 16 pages.
F. Siebenhaar, et al., "Combined Compression/Watermarking for Audio Signals", Preprints-Audio Engineering Society, May 2001, 10 pages.
I. Damnjanovic, et al., "Turbo Coding Protection of Compressed Domain Watermarking Channel", The International Conference on Computer as a Tool, EUROCON 2005, Nov. 21-24, 2005, DOI: 10.1109/ EURCON.2005.1629886, 4 pages.
D.K. Koukopoulos, et al., "A Compressed-Domain Watermarking Algorithm for Mpeg Audio Layer 3", Proceedings of the 2001 workshop on Multimedia and Security: new challenges, MM&Sec '01, Ottawa, Ontario, Canada, Oct. 5, 2001, ISBN: 1-58113-393-6, 4 pages.
Wikipedia, "Context-adaptive binary arithmetic coding", Nov. 9, 2015, 3 pages.
D. Zou, et al., "H.264 Stream Replacement Watermarking with CABAC Encoding", 2010 IEEE International Conference on Multimedia and Expo (ICME), Jul. 19-23, 2010, DOI: 10.1109/ICME.2010.5583550, 5 pages.
ITU-T - H.264—Telecommunication Standardization Sector of ITU, "Series H: Audiovisual and Multimedia Systems—Infrastructure of audiovisual services—Coding of moving video" Advanced video coding for generic audiovisual services, Recommendation ITU-T H.264, International Telecommunication Union, Feb. 2014, 2 pages.
I. Damnjanovic, et al., "Capacity Enhancement of Compressed Domain Watermarking Channel Using Duo-binary Coding", International Workshop on Digital Watermarking, IWDW 2006: Digital Watermarking, Lecture Notes in Computer Science, vol. 4283, 15 pages.
A. Afanasyeva, et al. "A Method of H.264 Video Watermarking Robust to Attack on I and P Frames by Removal", 2014 4th International Conference on Image Processing theory, Tools and Applications (IPTA), Oct. 14-17, 2014, DOI: 10.1109/IPTA.2014.7001951, 6 pages.
X. Jiang, et al., "A Robust H.264/AVC Video Watermarking Scheme with Drift Compensation", Hindawi Publishing Corporation, The Scientific World Journal, vol. 2014, Article ID 802347, http://dx.doi.org/10.1155/2014/802347, Research Article, Feb. 4, 2014, 14 pages.
A. Pal, et al., "A Novel, Low-Complexity Video Watermarking Scheme for H.264", Minds in Motion, TI Developer Conference, Mar. 7-9, 2007, Dallas, TX, 35 pages.
Y. Tew, et al., "Information Hiding in HEVC Standard Using Adaptive Coding Block Size Decision", 2014 IEEE International Conference on Image Processing (ICIP), Oct. 27-30, 2014, DOI: 10.1109/ICIP.2014/026113, 5 pages.

* cited by examiner

COMPRESSED DOMAIN DATA CHANNEL FOR WATERMARKING, SCRAMBLING AND STEGANOGRAPHY

TECHNICAL FIELD

The present disclosure relates to relates to media encoding and decoding.

BACKGROUND

It is often useful to add a user-specific data channel to a media stream, such as for watermarking, in order to provide a method for identifying the source of a copyright breach. Such channels can also be used for steganographic purposes. However, providing a specific watermark for each user typically involves that the watermark be applied to the original media prior to or during encoding. As a result, adding new users involves specific per-user re-encoding. This is not feasible in practice.

DESCRIPTION OF EXAMPLE EMBODIMENTS

Overview

In one embodiment, a computer-implemented method is provided for processing a video stream in the compressed domain for watermarking, scrambling and other applications. Syntax elements are generated for input video as part of a video compression process. The syntax elements are entropy coded with an arithmetic entropy encoding process to produce a compressed bitstream for the input video. Regions of frames of the input video and related syntax elements are identified as candidates for modification. Based on metadata associated with a particular user, the syntax elements, the regions, and entropy coding state of the arithmetic entropy encoding process, bytes of the input video are changed to generate a modifying bitstream that is unique to the particular user. The compressed bitstream is modified using the modifying bitstream to produce a decodable bitstream for the input video.

Example Embodiments

Presented herein are techniques to modify compressed media bitstreams such that a watermark (or other data) can be added in the compressed domain using lightweight (low cost) methods. Conventional watermarking techniques operate in the picture domain before compression, requiring an additional decoding and encoding operation if a compressed stream is to be modified. It is desirable that a watermark be detected in the media domain by commonly deployed methods.

One example use case is in media broadcast where it is desirable to produce a watermark for individual streams in a cost effective manner to assist in determining who is the violator of an authorized copy of the media by virtue of to whom that copy was originally sent or provided. After identifying the violator, the violator's distribution site can be taken down, for example.

Figure 1:
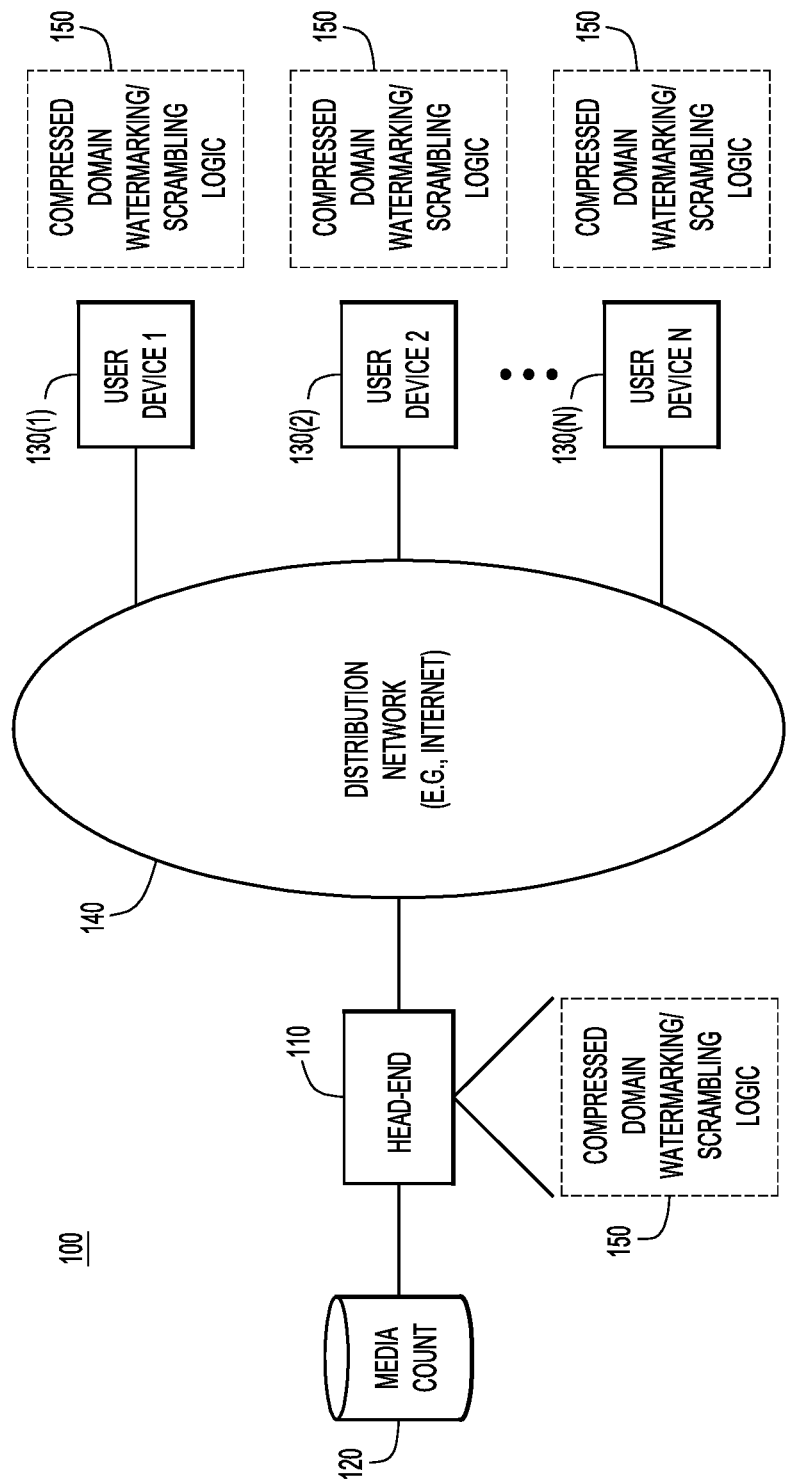
FIG. 1 is block diagram of a media distribution system configured to perform watermarking or scrambling of a media stream in a compressed domain, according to an example embodiment.

Turning now to FIG. 1, a block diagram of a media distribution system 100 according to an example embodiment is shown. The system 100 includes a head-end 110 or other distribution device that has access to a database of media content 120 for distribution to one or more user devices 130(1)-130(N) over a distribution network (e.g., the Internet) 140. The media content may include video content such as movies or other video programs (including software games, etc.). The system 100 is configured to be able to either detect the identity (by virtue of identifying the particular copy of the media content through a watermark included in the compressed data of the media content) of a source that distributed the media content without authorization, and/or to scramble the compressed media content so as to prevent unauthorized use of the media content. The user devices 130(1)-130(N) may be any type of device, physical or virtual (entirely-software based), that can decode a compressed media stream for presentation to a user on a display. Examples of such user devices include set-top boxes (STBs), laptop computers, desktop computers, Smartphones, tablet computers, software media players, etc.

A "lightweight" method is provided for generating a set of small bitstreams, called "microstreams" that may consist of only 10s or 100s of bytes spread across different locations in video framed data, for example, which can be used to modify a compressed video stream in a way that can be unique for each user. A microstream is also referred to herein as a "modifying bitstream" because it is ultimately used to modify a compressed (encoded) bitstream at a decoder (in a user device) in order to produce a valid and decodable bitstream. The compressed video stream may be one that is generated according to the H.264 or H.265 video codec standards. The modifications to the compressed video stream can produce changes that are imperceptible for the purposes of watermarking or steganography, or perceptible for the purposes of scrambling and access control. These unique per-user bitstreams can be added either at a distribution point (e.g., the head-end 110) or securely in a user device or other similar device or process (in hardware, hardware and software, or software only). To this end, the head-end 110 may be configured with compressed domain watermarking/scrambling logic 150 or each user device 130(1)-130(N) may be configured with compressed domain watermarking/scrambling logic 150. The compressed domain watermarking/scrambling logic 150 may be embodied by software instructions executed by a processor, appropriately configured hardware (digital logic gates), or a combination of software and hardware.

Figure 2:
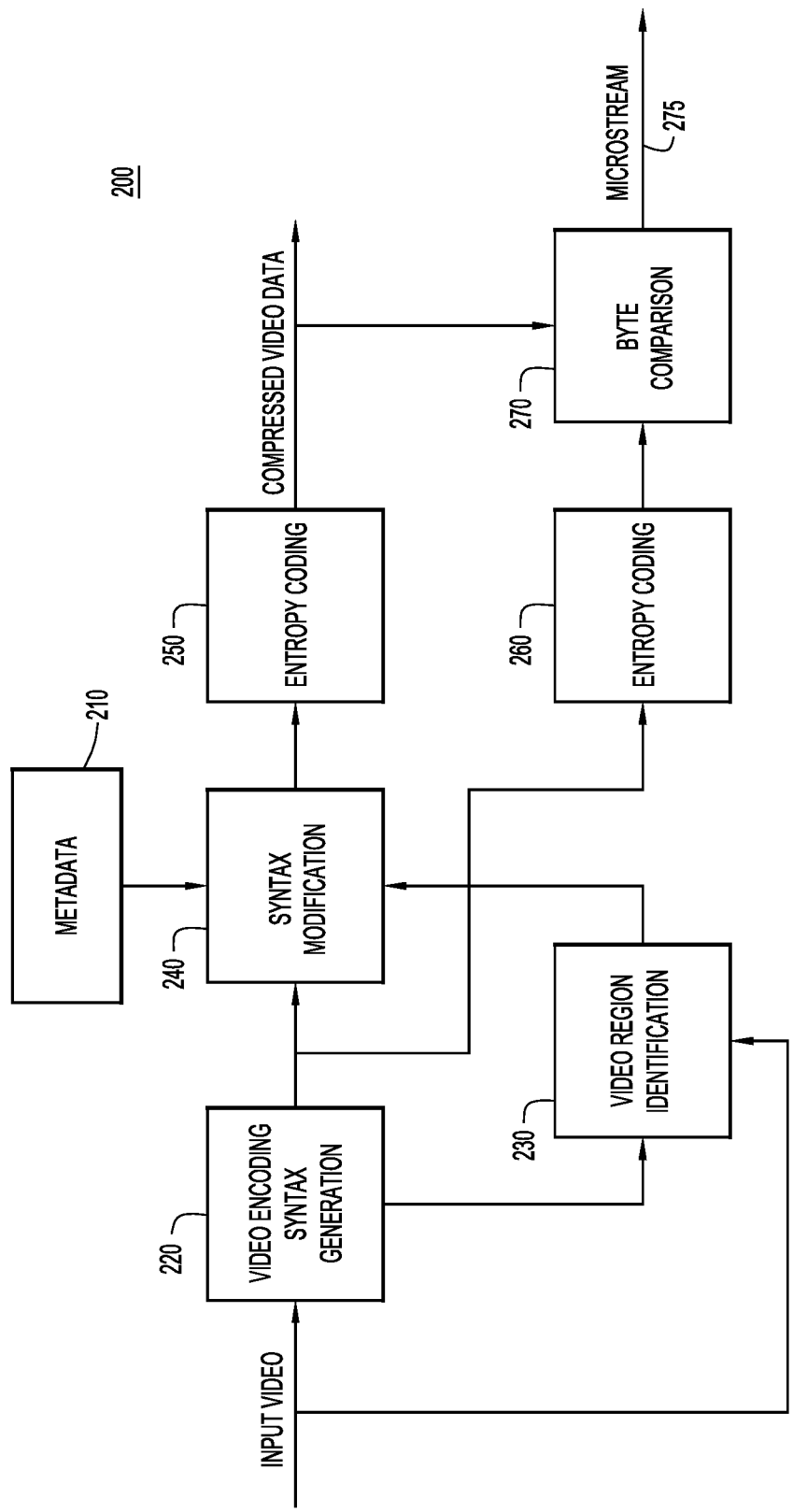
FIG. 2 is a high-level flow diagram of operations for watermarking or scrambling a media stream in the compressed domain, according to an example embodiment.

Reference is now made to FIG. 2 for an overview of the operations of the compressed domain watermarking/scrambling logic 150. In particular, FIG. 2 shows a flow diagram of a process 200 by which different microstreams are generated in a compressed-domain watermarking system, according to one example embodiment. The information to be conveyed is embodied in metadata 210. In other words, the watermarking signal is generated from the metadata. While not shown in FIG. 2, it is to be understood that the watermarking signal may be encoded for protection. One means of encoding is to generate a Pseudo-Random Bitstream Sequence (PRBS) from a spreading key and the watermarking metadata, which has a much higher data rate than the original watermarking metadata. Forward Error Correction (FEC) codes may also be employed either separately or in combination.

At 220, video encoding syntax generation is performed for input video. This syntax generation may be performed in accordance with the H.264 or H.265 video codec standards, for example, or any other suitable video codec standard now known or hereinafter developed that has suitable properties described further below. The metadata 210 representing the watermarking signal is used to modify syntax elements of the compressed video stream. To this end, at 230, the video is analyzed to identify portions/regions of frames affected by those syntax elements as well as the related syntax elements. In other words, at 230, regions of frames and related (corresponding) syntax elements of the input video are identified as candidates for modification. For example, high-activity regions with potential to mask a watermarking signal can be identified, and within those regions, coefficients are identified that could be modified with low visibility. At 240, using the regions identified at 230, the corresponding syntax elements are modified to produce a modified syntax stream. The modified syntax stream is entropy coded at 250 to produce a compressed video stream. In addition, an unmodified video stream is entropy coded at 260.

An arithmetic entropy encoding process is used to encode both the modified syntax elements and the unmodified syntax elements (at 250 and 260, respectively) to produce two bitstreams. At 270, the compressed video data from the modified syntax elements is compared with the compressed video data from the unmodified syntax elements to produce a list of differences that are included in a microstream (modifying bitstream) 275. According to the techniques presented herein, the syntax elements are bypass-encoded in order to ensure that the microstream can consist of a small number of isolated bytes (usually 1) for each bit changed in the syntax.

Figure 3:
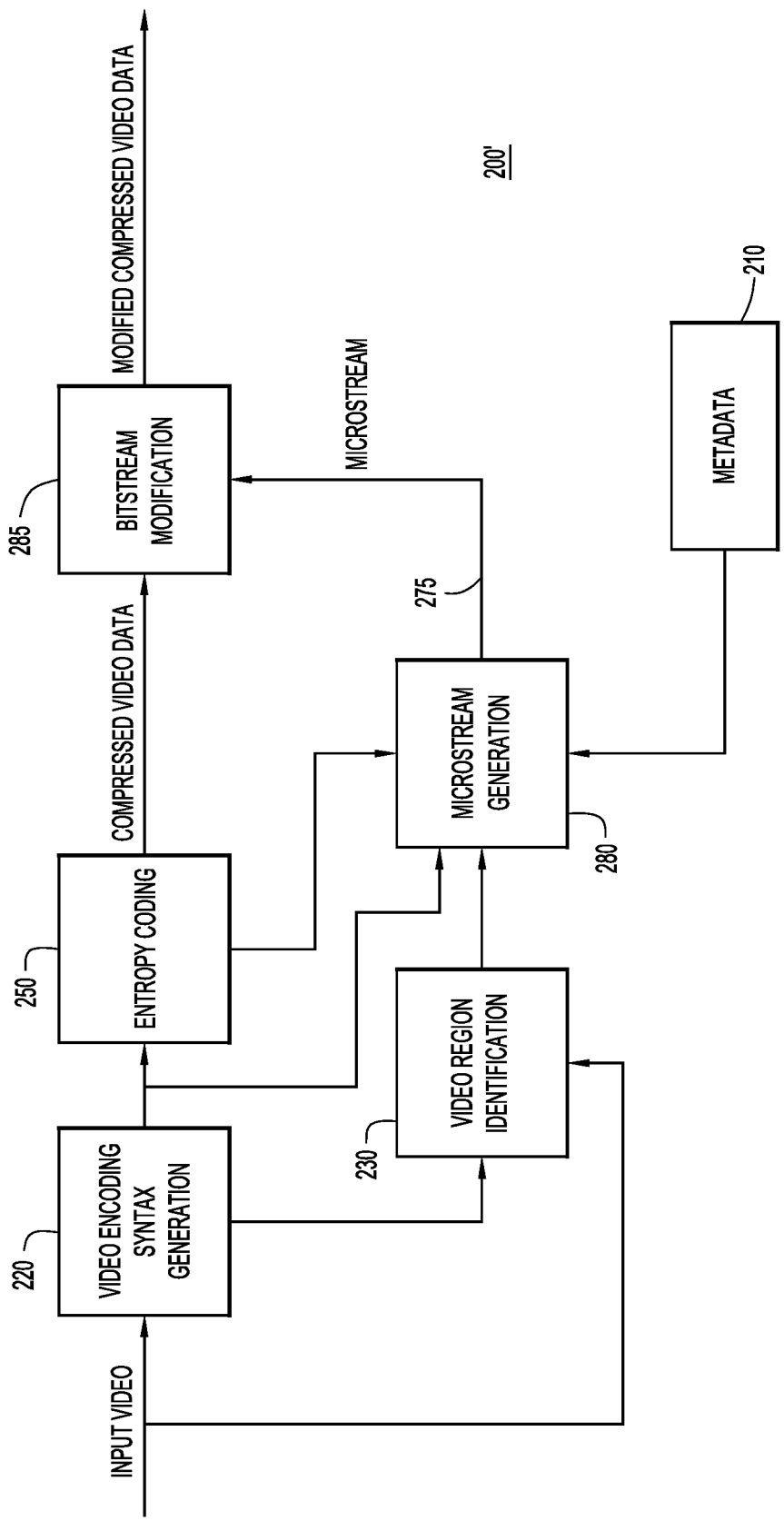
FIG. 3 is a flow diagram of operations for watermarking or scrambling a media stream in the compressed domain, according to another example embodiment.

FIG. 3 shows a process 200' that is similar to process 200 but in which a microstream is generated directly without entropy encoding of two different syntax streams. Given knowledge of which syntax elements are to be modified and how, and the current state of the entropy encoder arithmetic encoding process, a microstream generation operation 280 may directly determine which bytes will be modified and how they are modified, which will comprise the microstream 275. The microstream generation operation 280 is described below in more detail in connection with FIG. 5. The microstream 275 is then supplied to a bitstream modification operation 285 that produces a modified compressed video bitstream.

The bitstream modification operation 285 involves modifying the compressed video bitstream (a normal encoded video bitstream) with the microstream (modifying bitstream) to produce a valid and decodable (modified) bitstream for the input video. The modified compressed video data output by operation 285 is a representation of the input video. In one example, the modified compressed video data is a compressed (encoded) version of the input video with watermarking data added (in the compressed domain) based on the metadata so as to be visually imperceptible to a user when the modified compressed video data is decoded by a decoder at a user device, but which watermarking data can be extracted. In another example, the modified compressed video data is a scrambled version (in the compressed) of the input video domain when the metadata is a scrambling code. The metadata is also used to descramble the modified compressed video data.

Figure 4:
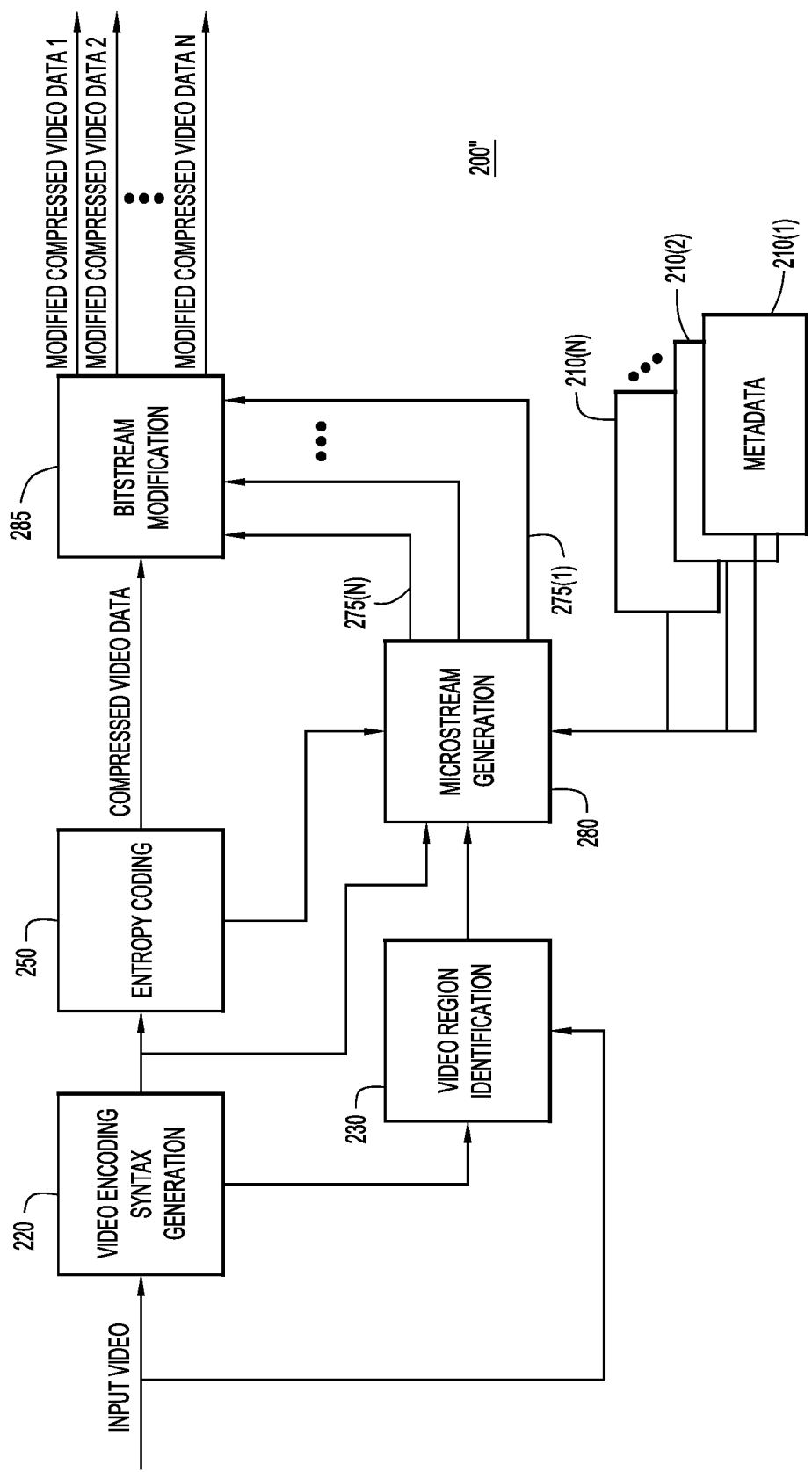
FIG. 4 is a flow diagram of operations for watermarking or scrambling a media stream in the compressed domain, according to yet another example embodiment.

FIG. 4 shows an extension of the process 200' of FIG. 3, for generating a plurality of microstreams. Specifically, process 200" includes operations 220, 230, 250 and 280, like those shown in FIG. 3, but the microstream generation operation 280 receives a plurality of sets of metadata 210(1)-210(N), where each metadata set is for generation of a corresponding microstream for a particular one of N users. The microstream generation operation 280 uses analysis of syntax elements which may be modified and the results of these modifications to produce a plurality of microstreams (modifying bitstreams) 275(1)-275(N) based on the plurality of sets of metadata 210(1)-210(N).

More specifically, using a compressed H.264 or H.265 stream "X", a number of microstreams 1–N (for N users) are produced, each of which is unique to a corresponding user such that the compressed bitstream X combined with any of these microstreams is a valid and decodable bitstream. This may done in a way that is imperceptible to the viewer, but which could be detected by watermarking detectors; or to scramble the video so that the user needs to have his/her specific microstream in order to view good-quality video.

As shown in FIG. 4, the bitstream modification operation 285 can generate N different modified compressed video bitstreams by modifying the compressed video bitstream output by entropy coding operation 250 with a corresponding one of the microstreams 275(1)-275(N).

Figure 5:
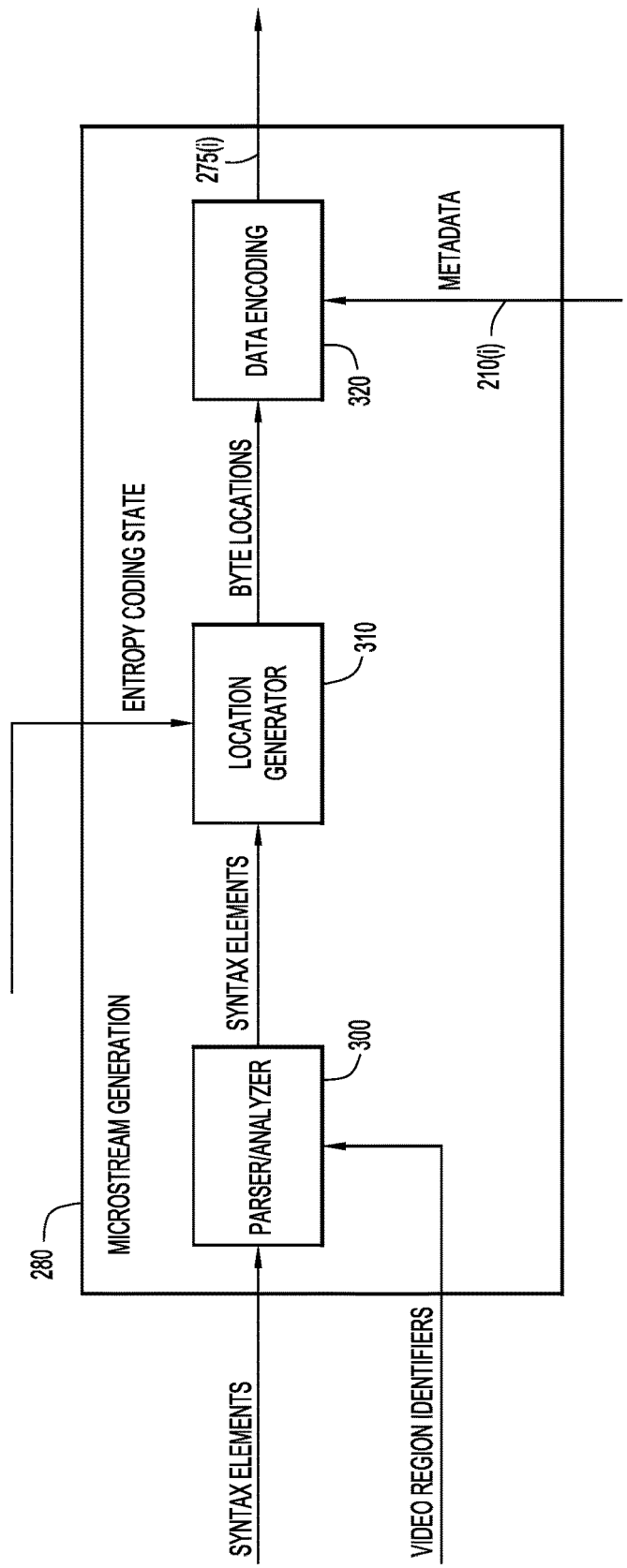
FIG. 5 is a flow diagram of operations to generate a modifying stream (microstream) according to an example embodiment.

Reference is now made to FIG. 5. FIG. 5 shows a flow diagram for the microstream generation operation 280. The microstream generation operation 280 includes a parser/analyser function 300, a location generator function 310 and a data encoding function 320. The parser/analyser function 300 receives as input syntax elements from operation 220 (FIG. 3 or 4) and video region identifiers from operation 230 (FIG. 3 or 4) and identifies potential syntax elements for modification. Potential syntax elements are encoded using bypass bits, but may need to satisfy other conditions according to the application. For watermarking applications, these potential syntax elements may be bypass-encoded syntax elements which relate to suitable regions (for example, high activity regions) of video where metadata may be hidden, in the current frame but also in subsequent frames that depend on the current frame. Examples include least-significant bits of transform coefficients, or motion vectors, or the signs of small coefficients. For scrambling applications these may be regions where modifying data would have the most impact and cause the most disruption to the video content. Examples include the signs of significant coefficients or of large motion vectors. The parser/analyser function 300 then outputs these suitable/potential syntax elements to the location generator function 310.

The location generator function 310 also receives as input entropy coding state from operation 250 (FIG. 3 or 4) and identifies which bytes would be changed and how, for each suitable/potential syntax elements. For example, this is determined by modifying the entropy coding state at the point at which the syntax element is encoded so that a "0" is encoded instead of a "1" or vice-versa, and comparing the resulting byte output. Each potential syntax location is then associated with a modified byte and byte location. Given a set of metadata to be encoded by the data encoding function 320, the byte locations within the set of possible locations are modified according to the unique metadata 210(*i*) to produce a corresponding microstream 275(*i*).

Thus, the microstream generation operation 280 takes potential locations and produces a list of pairs (offset, value) where each offset is a location that can be modified and each value is a legal value at that location. The pattern of (offset,value) pairs is an encoding of the metadata, and can be made unique to the user or application. In the bitstream modification operation 285 shown in FIGS. 3 and 4, a byte substitution operation is made which takes the microstream of (offset,value) pairs and modifies the compressed bitstream to contain the given value at the given offset, thereby producing the modified compressed video bitstream.

The Parser/Analyzer in More Detail

The parser/analyzer 300 is now described in more detail. The parser/analyzer 300 identifies bytes in the stream that can be modified and still produce a legal stream. Apart from packet headers, all data in an H.264 or H.265 stream are encoded with an entropy encoding process. In H.264 this is either an adaptive variable length coder (VLC) such as a context-adaptive variable length coder (CAVLC) or an arithmetic coder using Context-Adaptive Binary Arithmetic Coding (CABAC). In H265, only CABAC is used.

In CABAC, changing any one symbol value changes the arithmetic encoder state and the contexts, and the entire subsequent bitstream changes. Conversely, changing any single bit in a compressed CABAC stream changes all subsequent decoded values and produces either an illegal stream or completely corrupted video. However, there is an exception, and this is the encoding of binary symbols in a special "bypass" mode. This mode is invoked when the probabilities are exactly 50:50.

If a bypass-coded value is changed, then due to the internal operation of the arithmetic entropy encoder, a small number of bytes in the bitstream are changed. Normally, this is just one byte, but there may be "carries" where the change in internal state causes preceding bytes to change. Usually a carry is one byte, occasionally two, and very rarely more. Therefore, the techniques presented herein rely on modifying bypass-coded bits in the entropy coded stream. The microstream generation process 280 parses the video stream and identifies suitable values to change, and determines what impact changing them has on the encoded video stream.

Bypass-coded bits include:
sign bits
least significant bits (LSBs) of transform coefficients (for example, suffix bits of coeff_abs_level_minus1 in H.264)

In CAVLC, since actual bits are written, any bits may be modified so long as this does not affect the way contexts are adapted. This also includes sign bits and coefficient LSBs (of Direct Cosine Transform (DCT) coefficients), as well as motion vectors, filter coefficients, mode information (intra prediction modes and inter prediction modes), loop filter parameters, filter coefficients, filter selection parameters, block modes, or transform modes, as well as metadata contained in data headers.

Thus, the bypass mode is used to change a small number of bytes, and the bitstream can be "patched-up" in the compressed domain with the different byte values. In this way, it is possible to distribute a large number of microstreams to user devices, and the microstreams can be used at the user devices to modify the bitstream or a user device can decode a bitstream and change a few elements and then recompose the bitstream, and use that as the local copy.

Set forth below are text hexadecimal data dumps of two bitstreams, one with random bypass bits changed, and the other with random bypass bits not changed. In addition, a difference shown between those two bitstreams is provided. The video file is 1 frame of Forman at Quarter Common Intermediate Format (QCIF) resolution. Both bitstreams represent decodable bitstreams.

No Bypass Bit Modification:
0000000 000 000 000 000 001 147 144 000 050 254 321 202 304 344 000 000 000
0000010 001 150 351 112 070 260 000 000 000 001 150 132 122 336 054 000
0000020 000 000 001 150 172 122 356 054 000 000 000 001 145 210 204 000
0000030 042 211 327 134 372 373 121 164 236 033 162 163 072 261 104 133
0000040 120 312 030 142 340 262 151 327 156 216 162 211 041 164 144 042
0000050 372 314 046 021 257 166 025 340 002 044 044 126 352 116 306 261
0000060 104 331 125 117 366 175 161 140 025 032 121 014 337 274 205 031
0000070 254 213 354 163 141 105 307 223 052 322 161 265 342 251 037 135
0000080 360 163 245 164 041 137 254 110 201 323 353 372 025 105 361 226
0000090 355 135 260 131 257 016 143 277 031 253 166 025 111 124 263 347
00000a0 172 067 365 351 064 375 075 054 221 137 252 030 301 045 120 352
00000b0 042 242 060 112 203 341 206 114 233 207 331 016 127 341 120 347
00000c0 045 325 070 112 222 140 047 147 055 073 114 144 004 362 074 347
00000d0 345 172 156 373 162 300 115 140 217 015 052 115 207 020 001 251
00000e0 266 142 121 225 156 064 210 172 230 213 130 027 213 374 267 057
00000f0 317 144 334 264 272 327 116 363 233 037 146 046 012 267 031 126
0000100 121 021 273 014 162 333 351 035 073 202 337 223 032 167 117 113
0000110 236 002 306 041 170 231 062 014 362 341 347 344 236 070 361 016
0000120 150 252 032 305 044 317 254 344 264 217 111 257 016 137 325 335
0000130 125 231 017 013 253 342 031 254 101 007 311 003 337 175 110 052
0000140 230 201 230 276 076 345 064 010 002 214 351 377 334 241 051 323
0000150 316 173 370 134 034 072 375 246 327 377 101 205 114 245 017 122

0000160 061 176 267 136 213 157 153 275 255 003 043 005 270 276 120 047
0000170 106 032 117 060 042 210 254 215 176 306 122 152 127 145 324 361
0000180 132 244 265 125 074 005 377 214 312 315 230 251 345 344 232 104
0000190 224 243 314 312 055 304 265 170 123 037 344 137 177 165 040 120
00001a0 330 035 121 334 047 046 274 005 357 235 064 112 056 017 063 170
00001b0 206 131 273 326 256 252 111 151 211 177 313 207 304 054 307 347
00001c0 154 066 021 232 200 331 151 153 022 314 344 304 333 346 332 375
00001d0 172 016 164 235 316 123 120 257 167 255 272 167 211 176 215 232
00001e0 246 167 152 205 127 253 211 004 114 024 357 176 045 201 312 275
00001f0 142 011 302 023 374 030 341 326 310 257 215 211 137 070 124 152
0000200 105 016 100 063 135 225 104 233 065 254 033 316 362 127 141 203
0000210 311 320 157 017 031 376 313 012 240 171 343 137 227 272 032 123
0000220 323 126 156 206 313 122 243 041 047 120 162 127 155 315 011 266
0000230 052 245 162 335 210 031 362 205 277 123 244 112 150 331 346 272
0000240 132 363 250 035 070 310
0000246

Bypass Bit Modification:
0000000 000 000 000 001 147 144 000 050 254 321 202 304 344 000 000 000
0000010 001 150 351 112 070 260 000 000 000 001 150 132 122 336 054 000
0000020 000 000 001 150 172 122 356 054 000 000 000 001 145 210 204 000
0000030 042 211 327 134 372 373 121 164 236 033 162 163 072 261 104 133
0000040 120 312 030 142 340 262 151 327 156 216 162 211 041 164 144 042
0000050 372 314 046 021 257 166 025 340 002 044 044 126 352 116 306 261
0000060 104 331 125 117 366 175 161 140 025 032 121 014 337 274 205 031
0000070 254 213 354 163 141 105 307 223 052 322 161 265 342 251 037 135
0000080 360 163 245 164 041 137 254 110 201 323 353 372 025 105 361 226
0000090 355 135 260 131 205 016 143 277 031 253 166 025 111 124 263 347
00000a0 172 067 365 351 064 375 075 054 221 137 252 030 301 045 120 352
00000b0 042 242 060 112 203 341 206 114 233 207 331 016 127 341 120 347
00000c0 045 325 070 112 222 140 047 147 055 073 114 144 004 362 074 347
00000d0 345 172 156 373 041 300 115 140 217 015 052 115 207 020 001 251
00000e0 266 142 121 225 156 064 210 172 230 213 130 027 213 374 267 057
00000f0 317 144 334 264 272 327 116 363 233 037 146 046 012 267 031 126
0000100 121 021 273 014 162 333 351 035 073 202 337 223 032 167 117 113
0000110 236 002 306 041 170 231 062 014 362 341 347 344 236 070 361 016
0000120 150 252 032 305 044 317 254 344 264 217 111 257 016 137 325 335
0000130 125 231 017 013 253 342 031 254 101 007 311 003 337 175 110 052
0000140 230 201 230 276 076 345 064 010 002 214 351 377 334 241 051 323
0000150 316 173 370 134 034 072 375 246 327 377 101 205 114 245 017 122
0000160 061 176 267 136 213 157 153 275 255 003 043 005 270 276 120 047
0000170 106 032 117 060 042 210 254 215 176 306 122 152 127 145 324 361
0000180 132 244 265 125 074 005 377 214 312 315 230 251 345 344 232 104
0000190 224 243 314 312 055 304 265 170 123 037 344 137 177 165 040 120
00001a0 330 035 121 334 047 046 274 005 357 235 064 112 056 017 063 170
00001b0 206 131 273 326 256 252 111 151 211 177 313 207 304 054 307 347
00001c0 154 066 021 232 200 331 151 153 022 314 344 304 333 346 332 375
00001d0 172 016 164 235 316 123 120 257 167 255 272 167 211 176 215 232
00001e0 246 167 152 205 127 253 211 004 114 024 357 176 045 201 312 275
00001f0 142 011 302 023 374 030 341 326 310 257 215 211 137 070 124 152
0000200 105 016 100 063 135 225 104 233 065 254 033 316 362 127 141 203
0000210 311 320 157 017 031 376 313 012 240 171 343 137 227 272 032 123
0000220 323 126 156 206 313 122 243 041 047 120 162 127 155 315 011 266
0000230 052 245 162 335 210 031 362 205 277 123 244 112 150 331 346 272
0000240 132 363 250 035 070 310
0000246

Difference Bytes:
10c10<0000090 355 135 260 131 205 016 143 277 031 253 166 025 111 124 263 347
--->0000090 355 135 260 131 257 016 143 277 031 253 166 025 111 124 263 347
14c14<00000d0 345 172 156 373 041 300 115 140 217 015 052 115 207 020 001 251
--->00000d0 345 172 156 373 162 300 115 140 217 015 052 115 207 020 001 251

Changing the sign of small values, or the LSBs of small values, will produce small changes in the decoded residual. This will cause small mismatches with the original reconstructed pictures. This can fit well with established watermarking methods, for example, those which modulate very small changes in colors or DC levels. In other words, for watermarking applications, these techniques involve making a large number of small changes to insignificant portions of the picture, and correlating those together. This changes very insignificant parts of the picture that are difficult to see, which is desired for watermarking.

For scrambling purposes, the modified data can be chosen to have maximum disruption, for example, if signs of large values or higher level bits are modified. The metadata is used to repair (unscramble) the bitstream.

To summarize, the microstream generation operation 280 involves identifying potential syntax elements for modification based on identifiers of regions of frames of the input video which are candidates for modification; identifying which of the potential syntax elements may be changed and how bytes of the bitstream may be changed based on the entropy coding state and possible changes to the potential syntax elements, and producing identified byte locations representative thereof; and modifying the identified byte locations of the bitstream based on the metadata. In other words, with arithmetic coding a syntax element does not directly correspond to a set of bytes in the bitstream. With bypass coding, changes to the value correspond to changes to a finite number of byte locations in the bitstream.

Avoiding Error Propagation

There may be issues of dependencies between frames and within frames to be addressed in order to avoid error propagation because the decoder attempts to produce decoded video that is the same as the video that the encoder used to encode. Over time these errors may accumulate if these changes happen in reference frames and the modified data gets referenced during prediction.

One way to avoid this is to only modify non-reference frames. In hierarchical B-coding—the usual approach for broadcast and streaming applications—half the frames are typically non-reference frames. Alternatively, data can be modified just before an Instantaneous Decoder Refresh (IDR) frame.

In video communications, periodic Gradual Decoder Refreshes (GDRs) are often used which will reset any accumulated errors. A more sophisticated system could have an encoder create "safe" areas where data can be hidden, and the encoder will avoid propagating across many frames.

The principles of binary arithmetic coding are well known. Bit values b have probabilities $p0=p(b=0)$ and $p1=p(b=1)$, which are known to both encoder and decoder. The encoder and decoder both maintain a sub-interval of $[0,1)$ and adjust this according to the values that are encoded.

If this interval is [Low,Low+Range) then if a 0 is encoded the new interval becomes:

[Low,Low+Range*p0)

and if a 1 is encoded, the new interval becomes:

[Low+Range*p0,Low+Range)

New values of Low and Range are assigned according to the bounds of this new interval. For example, if 0 is coded Low is unchanged and Range is replaced by p0*Range; if 1 is coded, Low is replaced by Low+p0*Range, and then Range is replaced by p1*Range.

The interval therefore gets smaller and smaller, and the final interval (and any value within it) is unique to the sequence of values that have been encoded. Therefore, a binary representation of a value in the interval is an encoding of the sequence of values.

In a practical encoder, Low and Range and the probabilities are represented to finite precision by integer values, and the interval rescaling by an integer approximation. When the top bit of Low and High=Low+Range agree, that bit can be output and all the values rescaled by a factor 2 to keep them in a reasonable range.

There are circumstances in which Range can keep on becoming smaller and the top bits of Low and High do not agree. In such a case, the encoder will still rescale Low and stop outputting bits, and can modify past bits when agreement is eventually reached. This is called a carry.

Bypass Encoding in H.264/H.265

When $p0=p1=0.5$, the new interval is halved in size. This means that there will be a rescale by 2 in the future. H.264 and H.265 instead have a special bypass mode so that the rescale is done straight away, so that the range is unchanged and the lower interval bound changed instead:

if value=0, Low->2*Low if value=1, Low->2*Low+Range

This is very fast to encode and decode compared with the general arithmetic coding operations.

Modifying Bypass Data

If a 0 or 1 is coded as a bypass value at a given point, then in both coding paths, Range is unchanged. In one path, Range has been added to Low and in the other path it has not been added to Low. In H.264/H.265, Range normally has 9 bits (an implementation may use more by maintaining additional accuracy bits, but this does not affect the output bits or decoding process). This means that up to 9 bits differ between the two paths, plus more if coding a 1 caused a carry. Subsequent bits after these are the same, as Range is unchanged and Low has finite precision. The carry may cause a chain of carries in preceding bytes, which changes their values.

Figure 6:
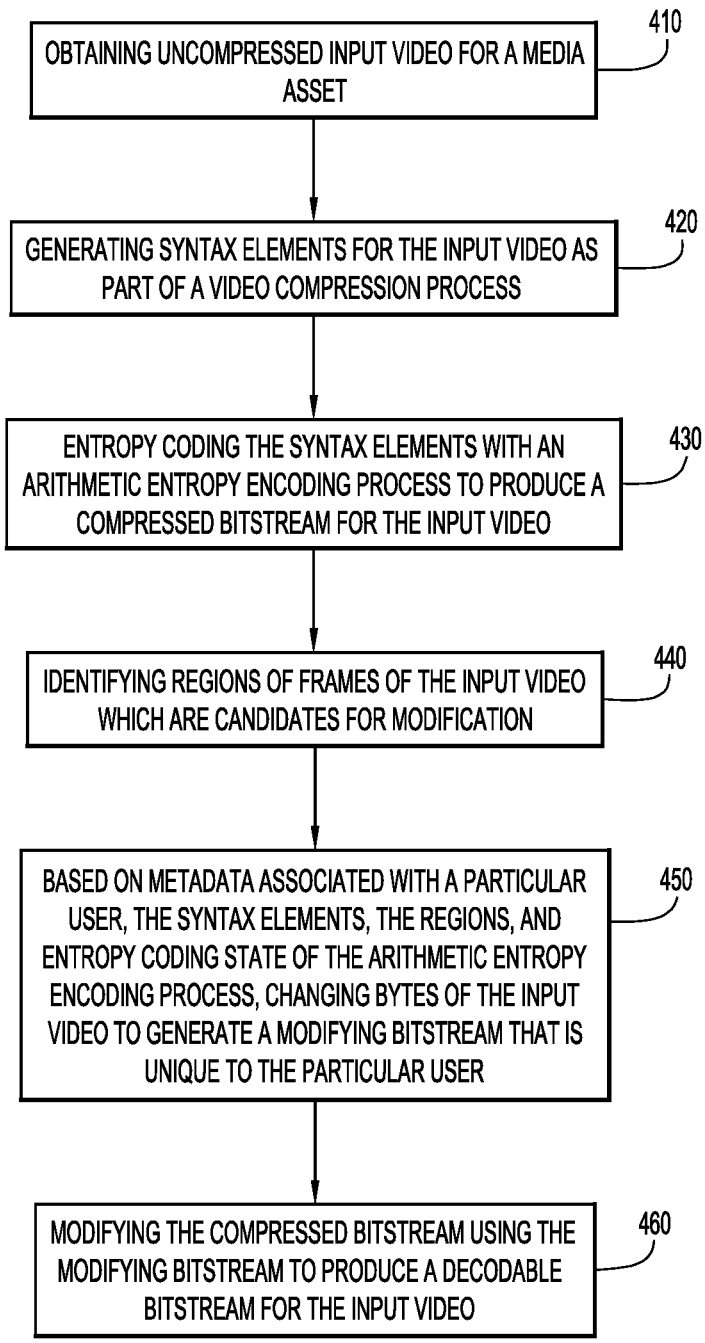
FIG. 6 is a flow chart of operations for watermarking or scrambling a media stream in the compressed domain, according to an example embodiment.

Turning now to FIG. 6, a flow chart is shown for a computer-implemented method/process 400 according to an example embodiment. The method 400 involves generating a microstream (a modifying bitstream) that is unique to a particular user, using the techniques described herein. As explained above, this process may be performed at a head-end or at a user device, but for purposes of generality, this method 400 is described as being performed at an apparatus. At 410, an apparatus obtains an uncompressed input video for a media asset. At 420, the apparatus generates syntax elements for the input video as part of a video compression process. At 430, the apparatus entropy codes the syntax elements with an arithmetic entropy encoding process to produce a compressed bitstream for the input video. At 440, the apparatus identifies regions of frames of the input video as candidates for modification. At 450, based on metadata associated with a particular user, the syntax elements, the regions, and entropy coding state of the arithmetic entropy encoding process, the apparatus changes bytes of the input video to generate a modifying bitstream that is unique to the particular user. At 460, the apparatus modifies the compressed bitstream using the modifying bitstream to produce a decodable bitstream (albeit modified) for the input video.

In one embodiment, the metadata is descriptive of a watermarking signal unique to the particular user, and in another embodiment, the metadata is descriptive of a scrambling code.

Figure 7:
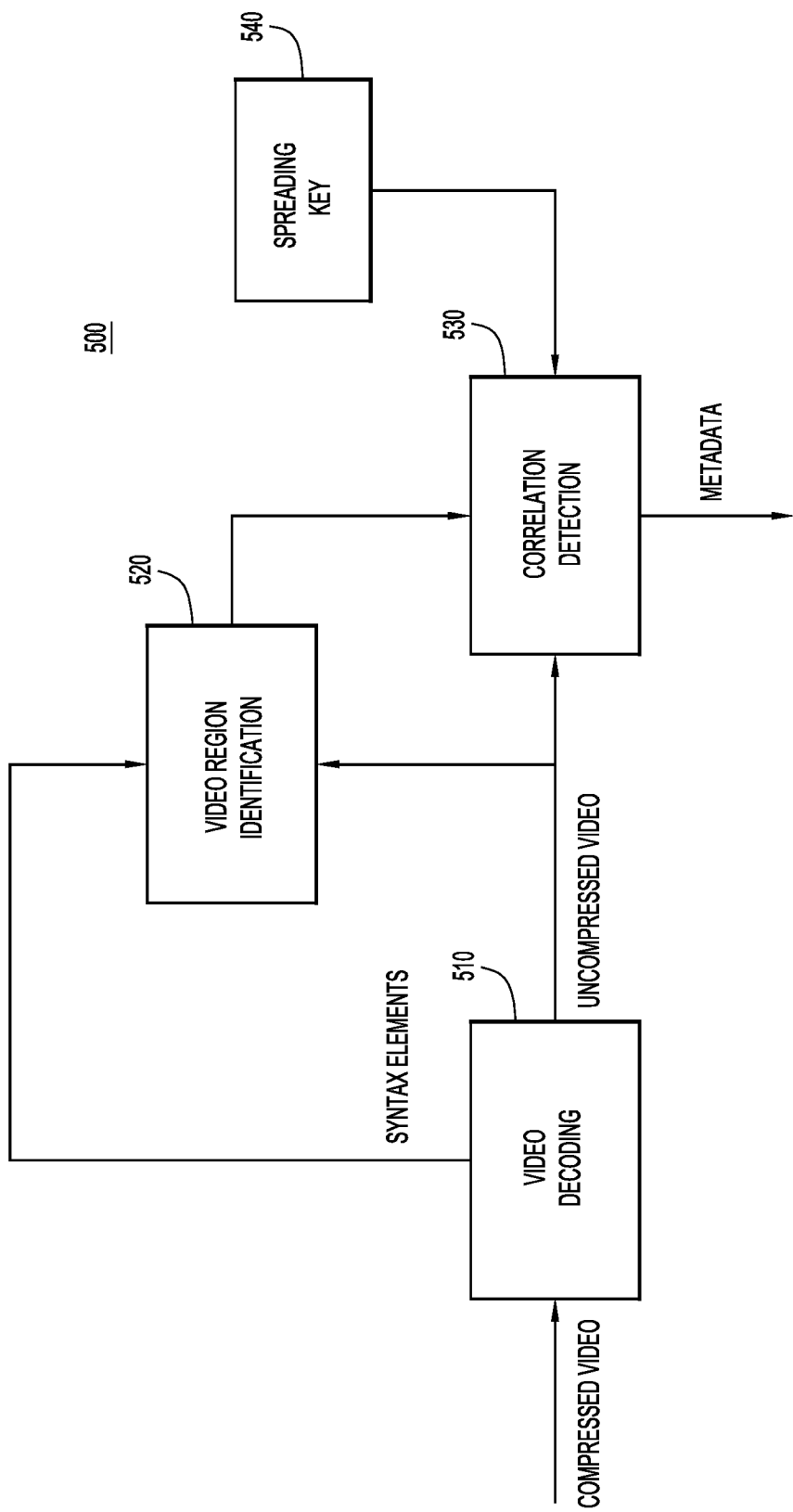
FIG. 7 is a flow diagram of operations to recover a watermark represented by metadata contained in a received media stream, according to an example embodiment.

With reference to FIG. 7, a flow chart is shown for a process 500 by which the metadata (descriptive of a watermarking signal) is extracted from the compressed video that has been generated according to the techniques described above in connection with FIGS. 1-6. This operation is, in general, performed by an apparatus that has access to the modified compressed bitstream. At 510, the apparatus decodes the compressed video bitstream using a suitable video decoding process compliant with any of the aforementioned standards (now known or hereinafter developed) to produce syntax elements and uncompressed video. At 520, using the syntax elements and the uncompressed video obtained at operation 510, the apparatus identifies regions of the video, syntax elements, and in particular bypass-coded bits, in which the metadata is encoded. At 530, the apparatus performs a correlation detection operation based on a spreading key 540 to extract the metadata from the uncompressed video using the regions identified at 520. The metadata is, in one embodiment, descriptive of a watermarking signal that is unique to a particular user. This watermarking signal can therefore be used to determine the source of the video, that is, for whom that video was originally intended/authorized.

Figure 8:
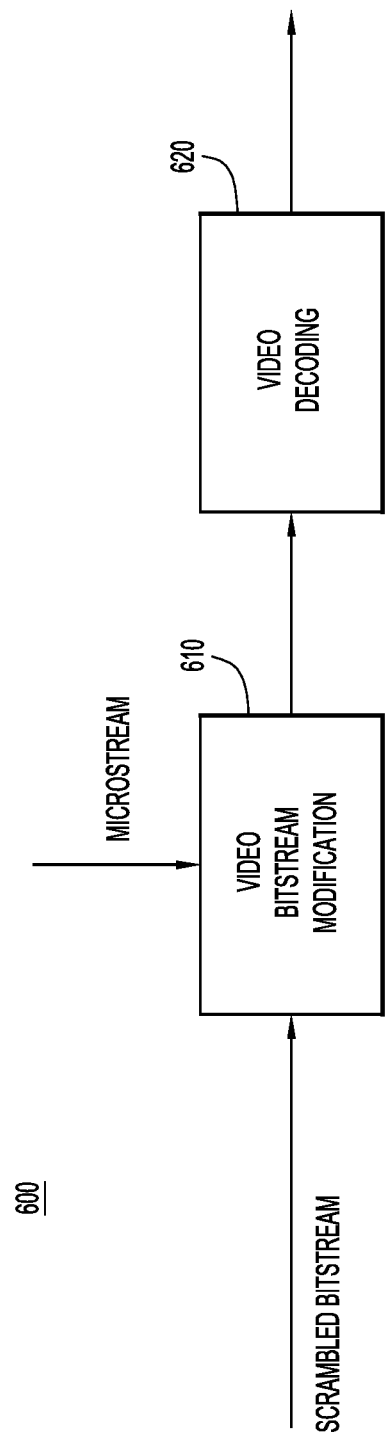
FIGS. 8 and 9 are flow diagrams of operations to descramble a media stream that was scrambled according to the techniques presented herein, in accordance with an example embodiment.
Figure 9:
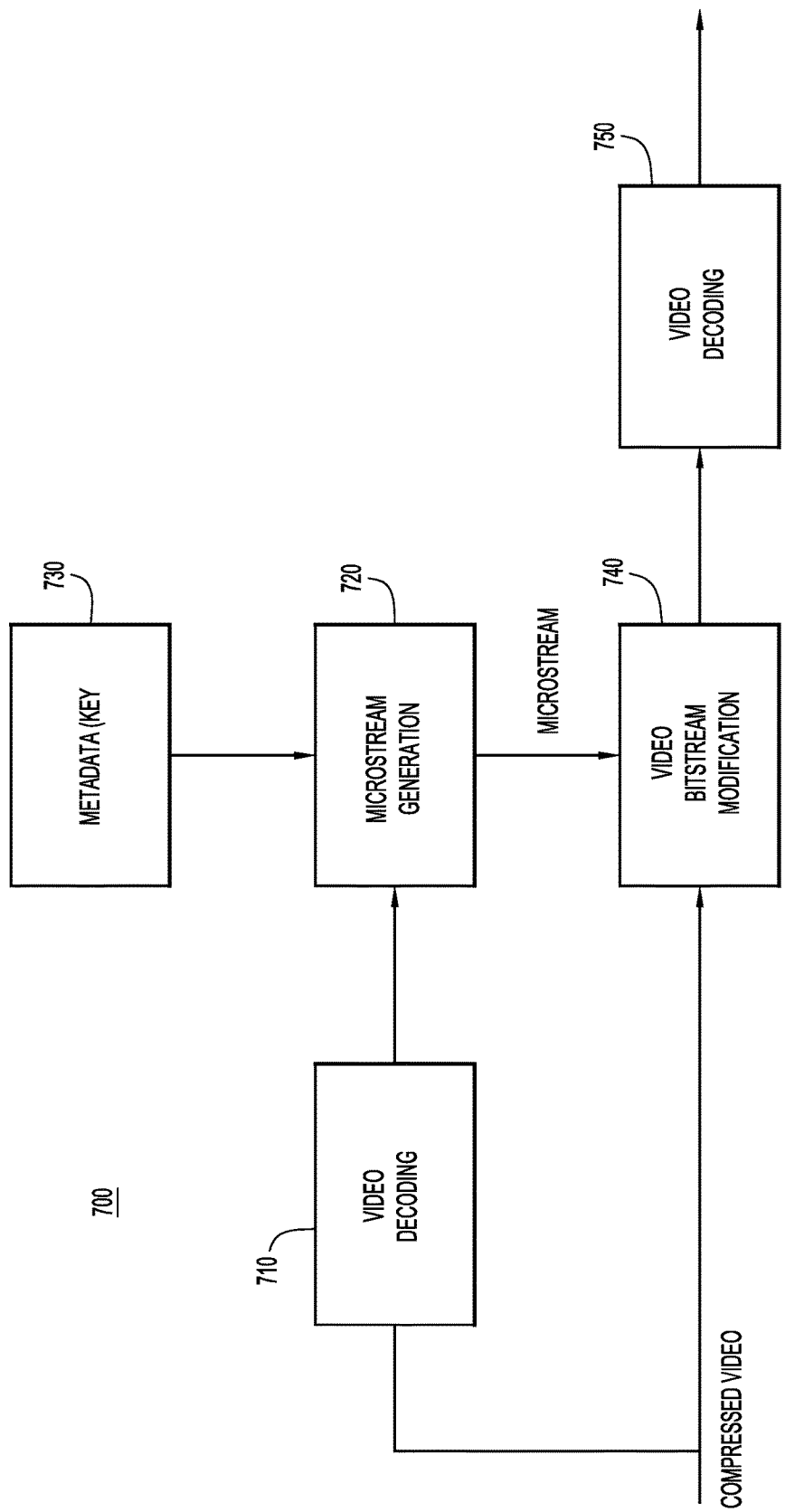

Reference is now made to FIGS. 8 and 9 for a description of video descrambling processes useful when a scrambling code has been used to intentionally corrupt video according to the techniques described herein. Generally, these processes are performed by a user device that receives a compressed (and scrambled) bitstream and has a microstream. In FIG. 8, the process 600 uses a microstream to unscramble a scrambled bitstream. At 610, the user device modifies the scrambled bitstream using the microstream and an inverse microstream modification operation (inverse to that described above in connection with FIGS. 2-6) to produce the original (unscrambled) compressed video stream. This inverse process invoked at 610 uses the microstream to determine the location and correct values of the modified bytes, and replaces the modified bytes with the correct values. The user device then decodes the original (unscrambled) compressed video stream by a video decoding operation 620 to produce a decoded video stream.

FIG. 9 shows a process 700 by which a user device generates an inverse microstream using the same metadata scrambling key that was used to generate the original microstream. At 710, the user device decodes the compressed video stream. At 720, the user device generates the microstream using the metadata (key) 730 (using a process such as that shown in FIG. 5). At 740, the user device modifies the compressed video using the microstream, thereby unscrambling the compressed video to produce an unscrambled compressed video stream. At 750, the user device decodes the unscrambled compressed bitstream to produce a decoded video stream.

Figure 10:
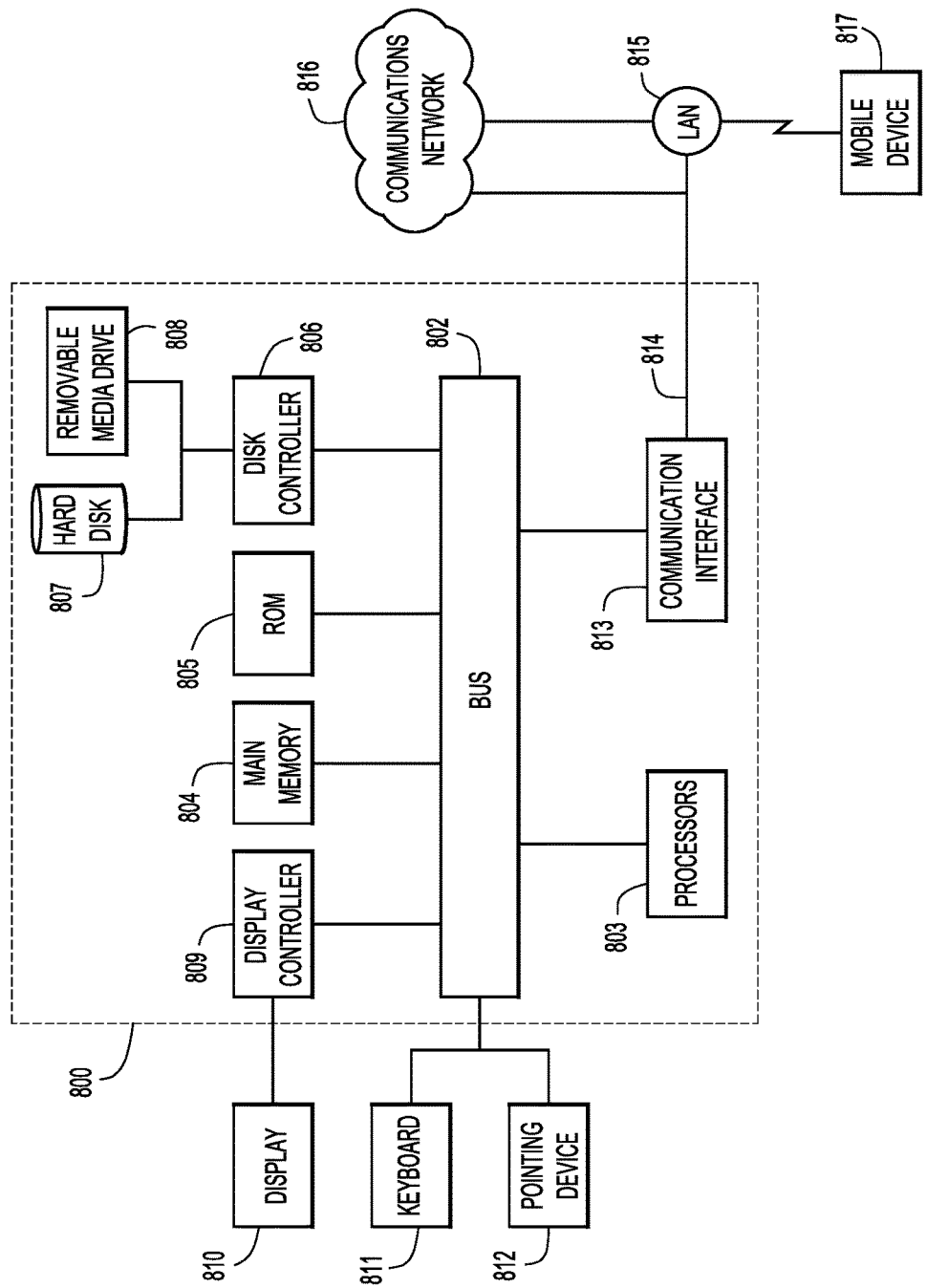
FIG. 10 is a hardware block diagram of an apparatus that may be configured to perform the encoding-side and decoding-side operations described herein, according to an example embodiment.

FIG. 10 is a block diagram of a computer system 800 upon which the embodiments presented may be implemented. The computer system 800 may be programmed to implement a computer based device, such as any device that includes a video encoder and/or video decoder that performs the operations described above in connection with FIGS. 1-9. The computer system 800 includes a bus 802 or other communication mechanism for communicating information, and a processor 803 coupled with the bus 802 for processing the information. While the figure shows a single block 803 for a processor, it should be understood that the processors 803 represent a plurality of processing cores, each of which can perform separate processing. The computer system 800 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 800 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 800 also includes a disk controller 806 coupled to the bus 802 to control one or more storage devices for storing information and instructions, such as a magnetic hard disk 807 or solid state drive, and a removable media drive 808 (e.g., floppy disk drive, read-only compact disc drive, read/write compact disc drive, removable magneto-optical drive and optical storage drive). The storage devices may be added to the computer system 800 using an appropriate device interface (e.g., small computer system interface (SCSI), integrated device electronics (IDE), enhanced-IDE (E-IDE), direct memory access (DMA), or ultra-DMA), or any other technologies now known or hereinafter developed.

The computer system 800 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 800 may also include a display controller 809 coupled to the bus 802 to control a display 810, such as a Liquid Crystal Display (LCD), Light Emitting Diode (LED) display, or other now known or hereinafter developed display technologies, for displaying information to a computer user. The computer system 800 includes input devices, such as a keyboard 811 and a pointing device 808, for interacting with a computer user and providing information to the processor 803. The pointing device 808, for example, may be a mouse, a trackball, a pointing stick or a touch-pad, for communicating direction information and command selections to the processor 803 and for controlling cursor movement on the display 810. The display 810 may be a touch-screen display.

The computer system 800 performs a portion or all of the processing steps of the process in response to the processor 803 executing one or more sequences of one or more instructions contained in a memory, such as the main memory 804. Such instructions may be read into the main memory 804 from another computer readable medium, such as a hard disk or solid state drive 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 800 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 800, for driving a device or devices for implementing the process, and for enabling the computer system 800 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 800 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local area network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 800 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 800 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular telephone.

The techniques presented herein are intended to be agnostic to any particular watermarking (or scrambling) scheme. Again, these techniques concern applying a number of different user-specific watermarks by patching bitstreams in the compressed domain.

To summarize, presented herein is a system for generating a large number of compliant video streams from a single base stream in the compressed domain, for watermarking, scrambling or data hiding purposes. Each modified stream can be chosen to differ in a small number of bytes from the original stream, and the byte pattern can be made to be unique. The modified stream can have imperceptible video changes.

Adding watermark data (or scrambling) in the compressed domain is particularly advantageous for its light weight computational requirements and for its increased convenience in the video workflow, in contrast with methods operating in the uncompressed domain. More specifically, this approach does not involve full re-encoding of bitstreams, and can generate a large number of unique streams after a single analysis pass. The "microstreams" added can easily be stored within secure storage on a user device, or sent out-of-band during a broadcast.

In summary, in one form, a computer-implemented method is provided comprising: obtaining uncompressed input video; generating syntax elements for the input video as part of a video compression process; entropy coding the syntax elements with an arithmetic entropy encoding process to produce a compressed bitstream for the input video; identifying regions of frames and related syntax elements of the input video which are candidates for modification; based on metadata associated with a particular user, the syntax elements, the regions, and entropy coding state of the arithmetic entropy encoding process, changing bytes of the input video to generate a modifying bitstream that is unique to the particular user; and modifying the compressed bitstream using the modifying bitstream to produce a decodable bitstream for the input video.

In another form, an apparatus is provided comprising: a communication interface; and a processor coupled to the communication interface, wherein the processor is configured to: obtain uncompressed input video; generate syntax elements for the input video as part of a video compression process; entropy code the syntax elements with an arithmetic entropy encoding process to produce a compressed bitstream for the input video; identify regions of frames and related syntax elements of the input video which are candidates for modification; and based on metadata associated with a particular user, the syntax elements, the regions, and entropy coding state of the arithmetic entropy encoding process, change bytes of the input video to generate a modifying bitstream that is unique to the particular user; and modify the compressed bitstream using the modifying bitstream to produce a decodable bitstream for the input video.

In still another form, one or more non-transitory computer readable storage media are provided encoded with instructions that, when executed by a processor, cause the processor to perform operations including: obtaining uncompressed input video; generating syntax elements for the input video as part of a video compression process; entropy coding the syntax elements with an arithmetic entropy encoding process to produce a compressed bitstream for the input video; identifying regions of frames and related syntax elements of the input video which are candidates for modification; based on metadata associated with a particular user, the syntax elements, the regions, and entropy coding state of the arithmetic entropy encoding process, changing bytes of the input video to generate a modifying bitstream that is unique to the particular user; and modifying the compressed bitstream using the modifying bitstream to produce a decodable bitstream for the input video.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   obtaining uncompressed input video;
   generating syntax elements for the input video as part of a video compression process;
   entropy coding the syntax elements with an arithmetic entropy encoding process to produce a compressed bitstream for the input video;
   identifying regions of frames and related syntax elements of the input video which are candidates for modification;
   based on metadata associated with a particular user, the syntax elements, the regions, and entropy coding state of the arithmetic entropy encoding process, changing bytes of the input video to generate a modifying bitstream that is unique to the particular user; and
   modifying the compressed bitstream using the modifying bitstream to produce a decodable bitstream for the input video.

2. The method of claim 1, wherein the metadata is descriptive of a watermarking signal unique to the particular user.

3. The method of claim 1, wherein changing bytes of the input video is performed to produce a unique modifying bitstream for each of a plurality of users based on unique metadata associated with each of the plurality of users.

4. The method of claim 1, wherein changing includes:
   identifying potential syntax elements for modification based on identifiers of the regions;
   identifying which of the potential syntax elements may be changed and how bytes of the bitstream may be changed based on the entropy coding state and possible changes to the potential syntax elements, and producing identified byte locations representative thereof; and
   modifying the identified byte locations of the bitstream based on the metadata.

5. The method of claim 4, wherein the potential syntax elements which are changed are encoded with bypass-coded bits.

6. The method of claim 5, wherein the modifying includes changing at least one of sign bits, transform coefficient bits, motion vectors, intra prediction modes, inter prediction modes, filter coefficients or filter selection parameters, loop filter parameters, quantization indices, header data or metadata contained in headers.

7. The method of claim 1, wherein changing comprises changing bytes of non-reference frames, including frames just before a decoder refresh frame.

8. The method of claim 1, wherein the metadata is descriptive of a scrambling code, and wherein modifying comprises modifying the compressed bitstream with the modifying bitstream to produce a scrambled bitstream based on the scrambling code, and further comprising:
   sending the scrambled bitstream to a user device associated with the particular user.

9. The method of claim 8, further comprising:
   modifying the scrambled bitstream using the modifying bitstream to produce an unscrambled compressed bitstream; and
   decoding the unscrambled compressed bitstream to recover the input video.

10. The method of claim 9, further comprising, at the user device:
    obtaining the metadata; and
    generating the modifying bitstream using the metadata.

11. An apparatus comprising:
    a communication interface; and
    a processor coupled to the communication interface, wherein the processor is configured to:
      obtain uncompressed input video;
      generate syntax elements for the input video as part of a video compression process;
      entropy code the syntax elements with an arithmetic entropy encoding process to produce a compressed bitstream for the input video;
      identify regions of frames and related syntax elements of the input video which are candidates for modification; and
      based on metadata associated with a particular user, the syntax elements, the regions, and entropy coding state of the arithmetic entropy encoding process, change bytes of the input video to generate a modifying bitstream that is unique to the particular user; and
      modify the compressed bitstream using the modifying bitstream to produce a decodable bitstream for the input video.

12. The apparatus of claim 11, wherein the metadata is descriptive of a watermarking signal unique to the particular user.

13. The apparatus of claim 11, wherein the processor is configured to change bytes of the input video to produce a unique modifying bitstream for each of a plurality of users based on unique metadata associated with each of the plurality of users.

14. The apparatus of claim 11, wherein the processor is configured to change bytes by:
    identifying potential syntax elements for modification based on identifiers of the regions;
    identifying which of the potential syntax elements may be changed and how bytes of the bitstream may be changed based on the entropy coding state and possible changes to the potential syntax elements, and producing identified byte locations representative thereof; and
    modifying the identified byte locations of the bitstream based on the metadata.

15. The apparatus of claim 14, wherein the potential syntax elements which are changed are encoded with bypass-coded bits.

16. One or more non-transitory computer readable storage media encoded with instructions that, when executed by a processor, cause the processor to perform operations including:
    obtaining uncompressed input video;
    generating syntax elements for the input video as part of a video compression process;
    entropy coding the syntax elements with an arithmetic entropy encoding process to produce a compressed bitstream for the input video;
    identifying regions of frames and related syntax elements of the input video which are candidates for modification;
    based on metadata associated with a particular user, the syntax elements, the regions, and entropy coding state of the arithmetic entropy encoding process, changing bytes of the input video to generate a modifying bitstream that is unique to the particular user; and modifying the compressed bitstream using the modifying bitstream to produce a decodable bitstream for the input video.

17. The non-transitory computer readable storage media of claim 16, wherein the metadata is descriptive of a watermarking signal unique to the particular user.

18. The non-transitory computer readable storage media of claim 16, wherein the instructions operable for changing bytes comprises instructions operable for changing bytes of the input video to produce a unique modifying bitstream for each of a plurality of users based on unique metadata associated with each of the plurality of users.

19. The non-transitory computer readable storage media of claim 16, wherein the instructions operable for changing bytes comprises instructions operable for:

identifying potential syntax elements for modification based on identifiers of the regions;

identifying which of the potential syntax elements may be changed and how bytes of the bitstream may be changed based on the entropy coding state and possible changes to the potential syntax elements, and producing identified byte locations representative thereof; and modifying the identified byte locations of the bitstream based on the metadata.

20. The non-transitory computer readable storage media of claim 16, wherein the potential syntax elements which are changed are encoded with bypass-coded bits.

* * * * *